(12) United States Patent
Kostelc et al.

(10) Patent No.: US 9,766,152 B2
(45) Date of Patent: Sep. 19, 2017

(54) MEDICAMENT SACHET LEAK TESTING SYSTEM

(71) Applicant: Mallinckrodt LLC, Hazelwood, MO (US)

(72) Inventors: James G. Kostelc, Creve Coeur, MO (US); Amelia G. Lukitsch, Rock Hill, MO (US)

(73) Assignee: MALLINCKRODT LLC, Hazelwood, MO (US)

(*) Notice: Subject to any disclaimer, the term of this patent is extended or adjusted under 35 U.S.C. 154(b) by 98 days.

(21) Appl. No.: 14/630,960

(22) Filed: Feb. 25, 2015

(65) Prior Publication Data

US 2015/0253213 A1    Sep. 10, 2015

Related U.S. Application Data (60) Provisional application No. 61/947,549, filed on Mar. 4, 2014, provisional application No. 61/954,066, filed on Mar. 17, 2014.

(51) Int. Cl.
*G01M 3/38* (2006.01)
*A61J 1/00* (2006.01)
*A61J 1/10* (2006.01)

(52) U.S. Cl.
CPC .......... *G01M 3/38* (2013.01); *A61J 1/00* (2013.01); *A61J 1/10* (2013.01)

(58) Field of Classification Search
CPC .................................................. G01M 3/38
USPC .................................................. 73/49.3
See application file for complete search history.

(56) References Cited

U.S. PATENT DOCUMENTS

| | | | | |
|---|---|---|---|---|
| 3,027,753 A | * | 4/1962 | Harder, Jr. ............ | G01M 3/027 428/69 |
| 4,662,591 A | * | 5/1987 | Encontre ............... | A47B 13/021 108/158 |
| 4,852,501 A | * | 8/1989 | Olson .................. | A47B 57/265 108/107 |
| 5,002,247 A | * | 3/1991 | Dispenza ............. | A47B 13/021 108/147.14 |

(Continued)

OTHER PUBLICATIONS

(EZ Tofu Press, May 26, 2012. Web. Jun. 21, 2016. <http://eztofupress.com/>. Internet Archive <https://web.archive.org/web/20120526005331/http://eztofupress.com/>.).*

*Primary Examiner* — Laura Martin
*Assistant Examiner* — Jean Morello
(74) *Attorney, Agent, or Firm* — Marsh Fischmann & Breyfogle LLP (57) ABSTRACT

A leak testing system (210) for medicament sachets (200) is disclosed. The system (210) includes a base section (220) having a flat surface (226). A plurality of guide rods (230) extend from this flat surface (226) of the base section (220). A press section (240) incorporates a plurality of through-holes (242) that are used to movably mount the press section (240) on the noted guide rods (230). The press section (240) includes a flat surface (246) that is maintained in at least substantially parallel relation to the flat surface (226) of the base section (220). A medicament pouch (200) may be compressed between these flat surfaces (226, 246) of the base section (220) and the press section (240) by sliding the press section (240) along the guide rods (230) and in the direction of the base section (240). Multiple press plates can be added to adjust the force and weight to test for leaks.

18 Claims, 6 Drawing Sheets

(56) References Cited

U.S. PATENT DOCUMENTS

| | | | | |
|---|---|---|---|---|
| 5,259,237 A * | 11/1993 | Aarts | ............... | G01M 3/36 |
| | | | | 73/49.3 |
| 6,142,814 A * | 11/2000 | Wu | ............... | H01R 12/7005 |
| | | | | 439/378 |
| 7,607,834 B2 * | 10/2009 | Alvater | ............... | B65D 75/5805 |
| | | | | 206/532 |
| 8,251,217 B2 * | 8/2012 | Hemmerlin | ............... | B65D 75/5805 |
| | | | | 206/532 |

* cited by examiner

MEDICAMENT SACHET LEAK TESTING SYSTEM

CROSS-REFERENCE TO RELATED APPLICATIONS

This patent application is a non-provisional patent application of, and claims priority to, each of the following applications: 1) U.S. Provisional Patent Application Ser. No. 61/947,549, that is entitled "MEDICAMENT SACHET LEAK TESTING SYSTEM," and that was filed on Mar. 4, 2014; and 2) U.S. Provisional Patent Application Ser. No. 61/954,066, that is entitled "MEDICAMENT SACHET LEAK TESTING SYSTEM," and that was filed on Mar. 17, 2014. The entire disclosure of each patent application that is set forth in this Cross-Reference to Related Applications section is hereby incorporated by reference.

FIELD OF THE INVENTION

The present invention generally relates to the leak testing for medicament sachets, pouches, and the like.

BACKGROUND

Topical analgesics are available in many dosage forms, including solutions, liquids, foams, gels, creams, ointments and the like. They are packaged in various container closure systems, such as tubes, bottles, pouches, and canisters. One common issue with many topical analgesic products is inaccurate unit dose dispensing from multi-dose containers, which may cause patient underdoses or overdoses. The advantage of the single unit package is more accurate dispensing of the drug in solution form. In at least certain cases, it is desirable for the medicament packaging to be leak-free in at least some respect.

SUMMARY

A first aspect of the present invention is embodied by a leak testing system. This leak testing system includes a base section, a press section, and a plurality of guide rods. The various guide rods extend away from the base, and the press section is movably mounted on these guide rods. A medicament sachet, pouch, or the like is positioned on the base section, and may be compressed between the base section and the press section.

A number of feature refinements and additional features are applicable to the first aspect of the present invention. These feature refinements and additional features may be used individually or in any combination. The following discussion is applicable to the first aspect, up to the start of the discussion of a second aspect of the present invention.

The base section may be in the form of a plate. The base section may be formed from any appropriate material or combination of materials (e.g., metal, such as stainless steel). During leak testing, the base section may be maintained in an at least substantially stationary or fixed position (e.g., the base section may be positioned on any appropriate supporting surface). The press section may be moved relative to the base section along the various guide rods and in the direction of the base section to perform a leak test on the medicament pouch.

The base section may include a first base section surface that projects at least generally in the direction of the press section when the press section is movably mounted on the guide rods. At least part of this first base section surface may be flat or planar, including that portion of the first base section surface that interfaces with the medicament pouch during a leak test. The entirety of the first base section surface that interfaces with the medicament pouch during a leak test may be flat or planar. One embodiment has the entirety of the first base section surface being flat or planar. Another embodiment has the first base section surface including a raised section that is flat or planar, and on which the medicament pouch may be disposed for performance of a leak test.

The various guide rods may be detachably engaged or interconnected with the base section in any appropriate manner. This detachable connection may maintain the guide rods in at least somewhat of a fixed orientation relative to the base section, the press section, or both. One embodiment has the guide rods being oriented at least substantially perpendicular to a flat or planar portion of the base section that interfaces with the medicament pouch during a leak test, at least substantially perpendicular to a flat or planar portion of the press section that interfaces with the medicament pouch during a leak test, or both.

One detachable connection that may be used between the guide rods and the base section is a threaded connection. An end section of each guide rod may be threaded, and the base section may include a separate threaded hole for each guide rod. Each such threaded hole extends at least into the base section (thereby encompassing each such threaded rod extending completely through the base section).

Any appropriate number of guide rods may be used by the leak testing system. One embodiment uses at least three guide rods. Another embodiment uses at least four guide rods. The multiple guide rods may be disposed in any appropriate arrangement, including triangular, rectangular, or the like. Although two guide rods could possibly maintain the press section in a desired orientation relative to the base section when configuring the leak testing system for a leak test, as well as during the leak test itself (the desired orientation being that a flat or planar portion of the press section (that engages the medicament pouch during a leak test) is at least substantially parallel with a flat or planar portion of the base section (that engages the medicament pouch during a leak test)), three or more guide rods may be more suitable.

Each guide rod may be formed from any appropriate material or combination of materials (e.g., metal, such as stainless steel). A representative shape for each guide rod is cylindrical. Other shapes may be appropriate. As discussed above, each guide rod extends at least generally away from the base section and may be characterized as terminating at a free end that is spaced from the base section. The free end of each guide rod may be characterized as being rounded, convexly-shaped, or the like (e.g., for facilitating installation of the press section on these guide rods). In any case, the various guide rods may be disposed in at least substantially parallel relation to one another.

The press section is movably mounted on the guide rods so as to dispose the press section in position for performance of a leak test on the medicament pouch. The press section may be characterized as being slidably mounted on the guide rods—the press section may be slid along the guide rods to position the press section for performance of a leak test on the medicament pouch that is located between the base section and the press section. One embodiment has the base section and each of the guide rods being maintained in a stationary or fixed position when configuring the leak testing system for performance of a leak test on a medicament pouch that is disposed between the base section and the press section (this "configuring" including moving the press section along the various guide rods and in the direction of the base section).

The press section may be in the form of a plate. The press section may be formed from any appropriate material or combination of materials (e.g., metal, such as stainless steel). The base section, the press section, and the guide rods may all be formed from a common material. During leak testing and as noted above, both the base section and the guide rods may be maintained in an at least substantially stationary or fixed position (e.g., the base section may be positioned on any appropriate supporting surface). The press section may be moved relative to the base section along the various guide rods and in the direction of the base section to perform a leak test on the medicament pouch.

The press section may include a first press section surface that projects at least generally in the direction of the base section when the press section is movably mounted on the guide rods. At least part of this first press section surface may be flat or planar, including that portion of the first press section surface that should interface with the medicament pouch during a leak test. The entirety of the first press section surface that interfaces with the medicament pouch during a leak test may be flat or planar. One embodiment has the entirety of the first press section surface being flat or planar. Another embodiment has the first press section surface including a raised section that is flat or planar, and that engages the medicament pouch during performance of a leak test.

A movable connection between the press section and the various guide rods may be provided by having the press section incorporate a plurality of holes that extend entirely through the press section. There may be a one-to-relation between the holes through the press section and the number of guide rods used by the leak test system (e.g., if there are four guides rods, the press section may include four holes—one for each guide rod). In any case and in one embodiment, the guide rods and the through-holes of the press section may be of a complementary shape and/or size (e.g., cylindrical guide rods and circular through-holes for the press section; square guide rods and square through-holes for the press section). There may be a small clearance in the movable connection between each guide rod and the press section.

The base section and the press section may be at least substantially parallel to one another when the leak testing system is in an assembled state or condition. In one embodiment, a flat or planar portion of the base section that interfaces with the medicament pouch during a leak test is at least substantially parallel with a flat or planar portion of the press section that interfaces with this same medicament pouch during a leak test (including where the base section and press section (e.g., their respective flat or planar portions) engage opposite sides of the medicament pouch). This relative orientation may exist when the press section is engaging the medicament pouch during a leak test, as well as during movement of the press section toward and away from the base section in preparation for and/or after a leak test on the medicament pouch.

Gravitational forces may be used to bias the press section in the direction of the base section during performance of a leak test on a medicament pouch that is disposed between the press section and the base section. The entirety of the force used to bias the press section in the direction of the base section during performance of a leak test on a medicament pouch that is disposed between the press section and the base section may be provided by gravitational forces (e.g., a user or operator of the leak testing system need not push down on the press section during a leak test; an actuating force need not be separately applied to the press section for performance of a leak test; the press section need not be powered by any external power source to exert a compressive force on the medicament pouch). Although the weight of the press section may be sufficient for a leak test of a given medicament pouch, it should be appreciated that one or more separate plates (or weights of any appropriate form) may be positioned/installed on the press section (e.g. on a surface of the press section that is opposite of that which interfaces with the medicament pouch during performance of a leak test on the medicament pouch) to exert a desired degree of compressive forces on the medicament pouch (but which still may be entirely in the form of gravitational forces). Different press sections of different weights may also be utilized by the leak testing system.

The medicament pouch may be in the form of a flexible, deformable, or pliable structure. In one embodiment, at least two sheets are sealed together in any appropriate manner (e.g. via heat sealing) to define at least part of an internal storage volume for the medicament pouch. Any appropriate medicament or medicine (e.g., a topical medication) may be retained within the medicament pouch. Typically the contents of the medicament pouch will include a liquid or other flowable material such as a gel or the like. The medicament pouch may be sized to accommodate a single dose of the medicament contained therein.

A second aspect of the present invention is embodied by a method of leak testing a medicament sachet, pouch, or the like. A first surface of a medicament pouch is positioned on a first compression surface that is flat or planar. A second surface of this same medicament pouch is contacted with a different second compression surface that is also flat or planar. The first and second surfaces of the medicament pouch that are contacted may be characterized as being at least generally oppositely disposed (e.g., opposite "sides" of the medicament pouch may be engaged during a leak test). The medicament pouch may be compressed between the first and second compression surfaces while maintaining the first and second compression surfaces in at least substantially parallel relation to one another. The first and second compression surfaces may be moved away from one another after having compressed the medicament pouch for a sufficient period of time.

A number of feature refinements and additional features are applicable to the second aspect of the present invention. These feature refinements and additional features may be used individually or in any combination. The following discussion is applicable to at least the second aspect.

The first compression surface may be maintained in a fixed position throughout the compression of the medicament pouch between the first compression surface and the second compression surface. There may be at least some movement of the second compression surface in the direction of the first compression surface after the second compression surface initially contacts the medicament pouch and which may compress the medicament pouch to at least some degree, although the amount of movement may be relatively small.

The second compression surface may be advanced at least generally toward the first compression surface, including to compress the medicament pouch between the first and second compression surfaces as noted. At least a certain amount of movement of the second compression surface in the direction of the first compression surface may occur prior to the second compression surface actually contacting the medicament pouch. However, advancement of the second compression surface in the direction of the first compression surface will at least eventually result in the second compression surface contacting the medicament pouch to compress the medicament pouch between the first and second compression surfaces. During this advancement of the second compression surface relative to the first compression surface, the first and second compression surfaces may be maintained in at least substantially parallel relation to one another.

One embodiment has the first compression surface being incorporated by a base section of the type discussed above in relation to the first aspect. One embodiment has the second compression surface being incorporated by a press section of the type discussed above in relation to the first aspect.

A press section in the case of the second aspect may be advanced and/or guided along a predetermined path (e.g., via a plurality of guide rods) and in a first direction that is at least generally toward the first compression surface (e.g., incorporated by a base section of the type addressed above in relation to the first aspect). At least part of this advancement may be used to compress the medicament pouch. The orientation of the press section may be at least substantially maintained as the press section is advanced in this manner. Gravitational forces may be used to advance the press section along the predetermined path and in the first direction toward the first compression surface. The entirety of the compressive force exerted by the press section on the medicament pouch may be generated from gravitational forces (e.g., acting on the press section and/or any additional weights that may be positioned/installed on the press section). In one embodiment, no external power source is used to compress the medicament pouch between the first and second compression surfaces.

Movement of the second compression surface away from the first compression surface may entail lifting the second compression surface. The first and second compression surfaces may be maintained in at least substantially parallel relation to one another throughout movement of the second compression surface away from the first compression surface. In the case where a press section incorporates the second compression surface, the press section may be moved and/or guided along a predetermined path (e.g., via a plurality of guide rods) and in a second direction that is at least generally away from the first compression surface (e.g., incorporated by a base section of the type addressed above in relation to the first aspect). The orientation of the press section may be at least substantially maintained as the press section is moved away from the first compression surface in this manner.

Compression of the medicament pouch in accordance with the second aspect may be characterized as testing the medicament pouch for leaks. Leakage from the medicament pouch from the compression may be detected in any appropriate manner. A visual inspection of the medicament pouch and/or the first compression surface (e.g., after the compression, and including after the second compression surface has been moved away from the first compression surface), may provide a visual indication (e.g., to a user or operator) that leakage has occurred (e.g., by contents from the medicament pouch now existing on the first compression surface and/or an absorbent material that may have been positioned between the medicament pouch and the first compression surface). Disposing an absorbent sheet on the first compression surface, and then disposing the medicament pouch on this absorbent sheet, may enhance the visual indication of a leak. Such an absorbent sheet may also reduce the potential of fluids (that may have leaked from the medicament pouch as a result of its compression) spilling off of the first compression surface.

The medicament pouch described herein may contain a single dose of any appropriate medicament. The leak testing described herein may be configured as a gross leakage test for detecting an incomplete or very weak seal (e.g., a heat seal) used by the medicament pouch. The leak testing described herein may be configured as a burst test and may detect a moderately weak seal used by the medicament pouch (e.g., by using additional weight compared to a gross leakage test configuration; by compressing the medicament pouch to a greater degree than for a gross leakage test configuration). Generally, the leak testing described herein may be characterized as a container closure integrity test. Leakage from testing of a medicament pouch in accordance with the present invention may be detected visually.

Selection of the materials of construction for the leak testing device may be based on being compatible with the formulation of the medicament within the medicament pouch, should leakage occur during testing. The leak testing device described herein may be compatible with volatile organic solvents. The leak testing device described herein may be readily used in a variety of environments (e.g., laboratory, manufacturing) without any power input.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof. Finally, a reference of a feature in conjunction with the phrase "in one embodiment" does not limit the use of the feature to a single embodiment.

DETAILED DESCRIPTION

Figure 1:
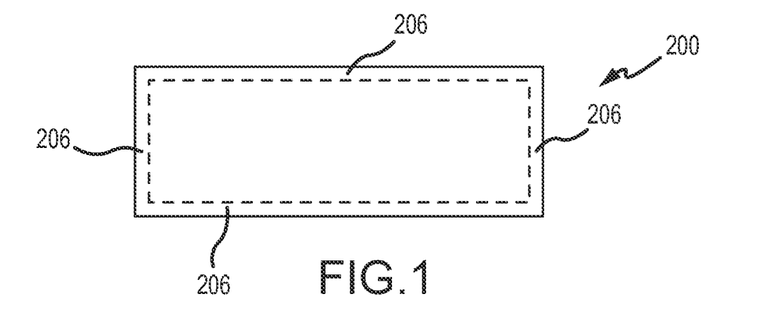
FIG. 1 is a plan view of one embodiment of a medicament pouch.
Figure 2:
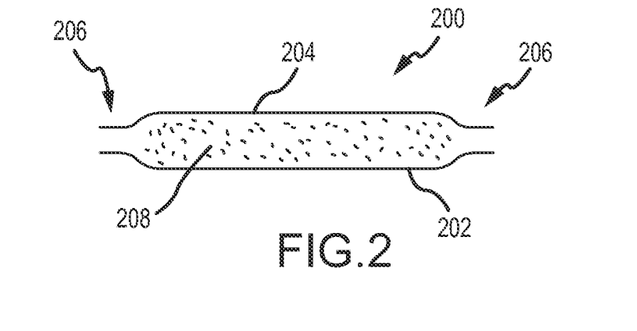
FIG. 2 is a cutaway view of the medicament pouch of FIG. 1.

One embodiment of a medicament sachet, package, pouch, or the like is illustrated in FIGS. 1-2 and is identified by reference numeral 200. Generally, the medicament pouch 200 contains an appropriate medicament (e.g., a medication or drug, for instance one to be topically applied to a patient), typically in the form of a liquid or other flowable substance (e.g., a gel or paste). A first sheet 202 may be sealed in any appropriate manner (e.g., heat sealing) to a second sheet 204 throughout a seal region 206 to define at least a portion of interior cavity in which a medicament 208 may be contained for the medicament pouch 200 (the first sheet 202 is shown as being spaced from the second sheet 204 in the seal region 206 in FIG. 2 for ease of illustration—the first sheet 202 may actually be in contact with the second sheet 204 within/throughout the seal region 206). The seal region 206 may be of any appropriate shape, and in the illustrated embodiment defines a closed perimeter for the region of the medicament pouch 200 that contains the medicament 208. Other layers may be incorporated by the medicament pouch 200. In the illustrated form, the medicament pouch 200 is configured to be opened (e.g., via an individual manually tearing or ripping the medicament pouch 200) and then manually compressed by an individual to dispense the contents of the medicament pouch 200.

The medicament pouch 200 may be characterized as a flexible, pliable, and/or deformable structure. Medicament 208 may be dispensed from the medicament pouch 200 by opening the medicament pouch 200 in any appropriate manner, and then compressing or squeezing the medicament pouch 200 (e.g., by deforming the medicament pouch 200; moving the first sheet 202 and the second sheet 204 at least generally toward one another).

Figure 3:
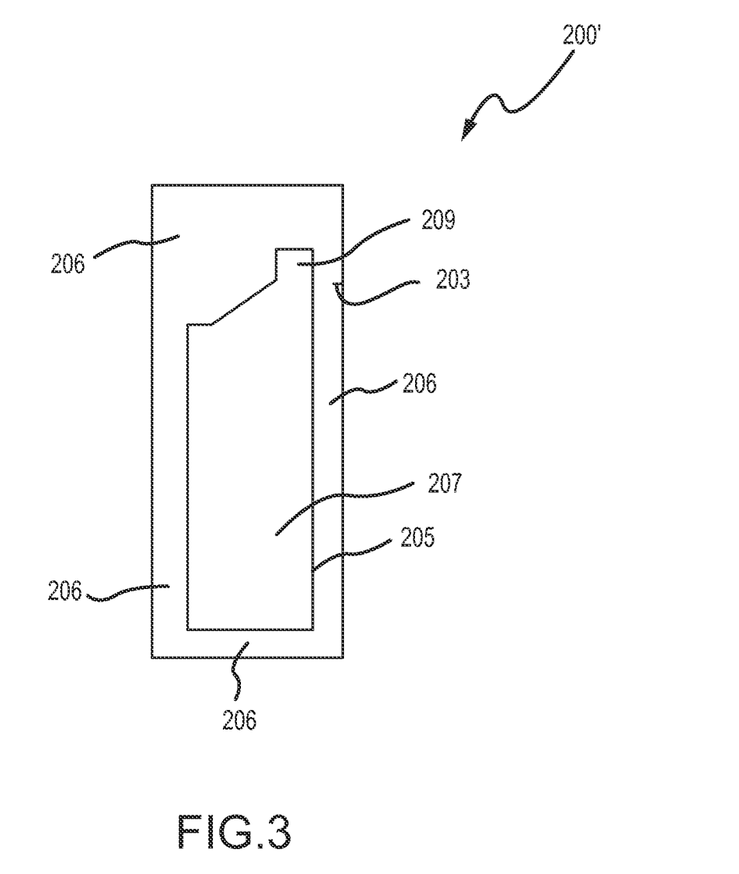
FIG. 3 is a plan view of another embodiment of a medicament pouch.

Another embodiment of a medicament sachet, package, pouch, or the like is illustrated in FIG. 3 and is identified by reference numeral 200'. Unless otherwise noted, the discussion of the medicament pouch 200 is equally applicable to the medicament pouch 200'. In the case of the medicament pouch 200' of FIG. 3, the seal region 206 is configured so as to define a medicament cavity boundary or perimeter 205 that incorporates a spout 209 on one end of a medicament cavity 207. The spout 209 may be characterized as having a reduced width compared to a remainder of the medicament cavity 207, and again may define one end of the medicament cavity 207. As in the case of the medicament pouch 200, the medicament cavity 207 contains the above-noted medicament 208 (or any other appropriate fluid). The medicament pouch 200' may also include a score 203, perforation, or the like to facilitate opening of the medicament pouch 200'- to provide an opening to the medicament cavity 207 for dispensing medicament from the medicament pouch 200'.

Figure 4:
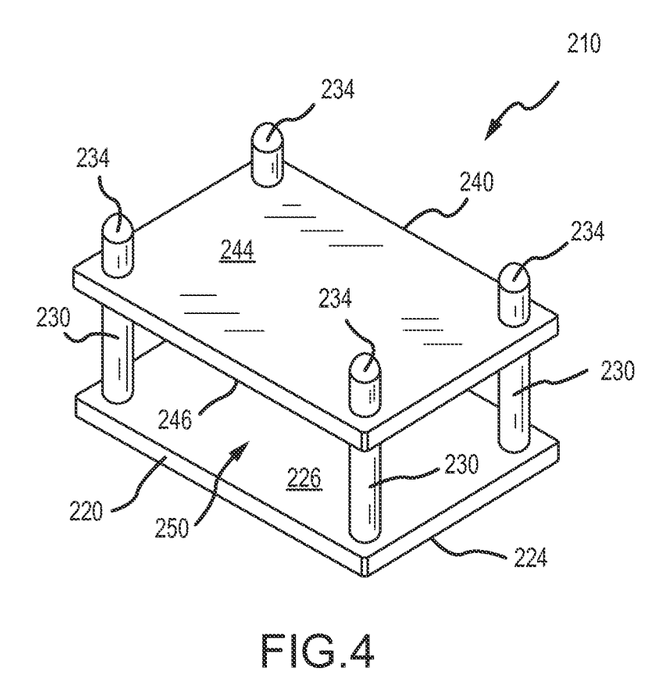
FIG. 4 is a perspective view of one embodiment of a leak testing system.
Figure 5:
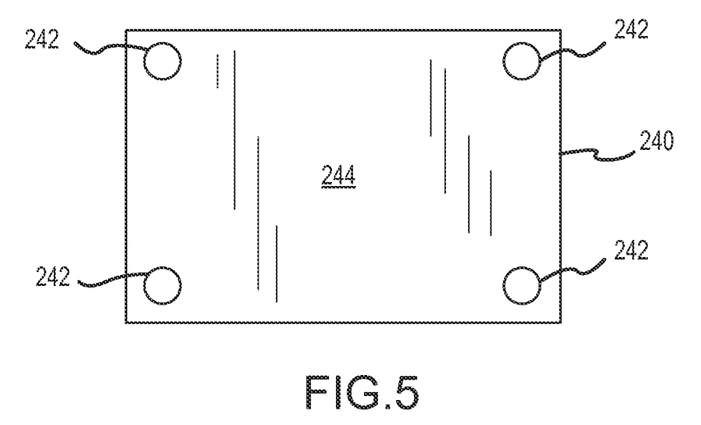
FIG. 5 is a top view of a press section used by the leak testing system of FIG. 4.
Figure 6:
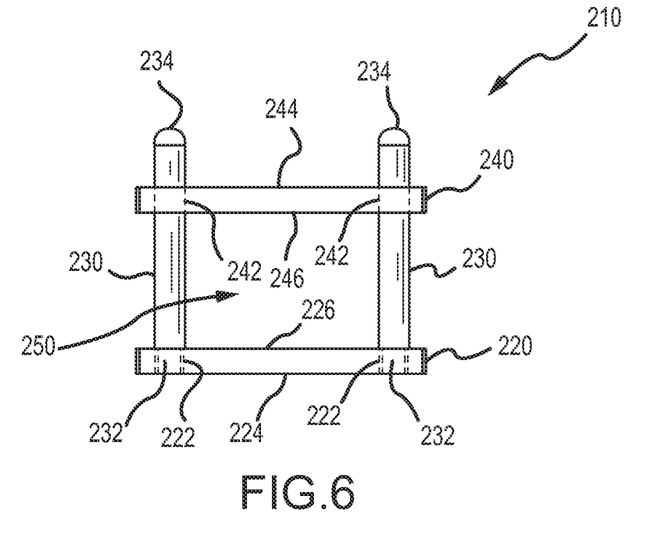
FIG. 6 is an end view of the leak testing system of FIG. 4.

One embodiment of a leak testing system is illustrated in FIGS. 4-6 and is identified by reference numeral 210. The leak testing system 210 may be used to test the medicament pouch 200 (as well as the medicament pouch 200' or any other similar medicament pouch) for leaks, for instance leaks in one or more portions of the noted seal region 206. Components of the leak testing system 210 include a base section 220, a press section 240, and a plurality of guides, guide rods, or guide pins 230. Generally, a medicament pouch 200 may be disposed between the base section 220 and the press section 240 in a manner that compresses the medicament pouch 200. Medicament 208 may be discharged from the medicament pouch 200 if the seal region 206 is deficient in one or more respects.

The base section 220 may be at least generally in the form of a plate, and may be formed from any appropriate material or combination of materials (e.g., metal, for instance stainless steel). A first base section surface 226 and a second base section surface 224 may be provided for the base section 220. The first base section surface 226 is that portion of the base section 220 that defines one boundary of what may be referred to as a medicament pouch cavity 250—a space in which the medicament pouch 200 may be positioned when being leak tested. The second base section surface 224 of the base section 220 may be positioned on an appropriate supporting surface (e.g., a countertop). The first base section surface 226 and the second base section surface 224 may be characterized as being oppositely disposed.

At least that portion of the first base section surface 226 that interfaces with the medicament pouch 200 is flat or planar (such a flat or planar portion of the first base section surface 226 may be characterized as a "compression surface"). The entirety of the first base section surface 226 is flat or planar in the illustrated embodiment. The entirety of each of the first base section surface 226 and the second base section surface 224 may be flat or planar, including where the first base section surface 226 and the second base section surface 224 are disposed in at least substantially parallel relation to one another.

The spacing between the first base section surface 226 and the second base section surface 224 defines a thickness for the base section 220. A plurality of holes 222 intersect with the first base section surface 226, and each hole 222 at least extends in the direction of the second base section surface 224. One embodiment has each of the holes 222 extending through the entire thickness of the base section 220—from the first base section surface 226 to the second base section surface 224. The various holes 222 on the base section 220 may be disposed in at least substantially parallel relation to one another (more specifically, the perimeter sidewall surfaces that define these holes 222 may be disposed at least substantially parallel to one another). Each guide ride 230 may be detachably connected with the base section 220. In this regard, each of the holes 222 for the base section 220 may be in the form of threaded holes 222.

The plurality of guide rods 230 extend from the first base section surface 226 of the base section 220 (in a direction that is also away from the second base section surface 224). The various guide rods 230 may be formed from any appropriate material or combination of materials (e.g., metal, for instance stainless steel). In one embodiment, the base section 220, the various guide rods 230, and the press section 240 are all formed from a common material (e.g., metal, for instance stainless steel).

Each guide rod 230 may be characterized as being detachably connected with the base section 220 as noted. One way of providing this detachable connection is to provide for a threaded engagement between each guide rod 230 and the base section 220. In this regard, a threaded end section 232 of each guide rod 230 may be threaded into a corresponding threaded hole 222 of the base section 220. Each guide rod 230 also includes a free end 234. In the illustrated embodiment, the free end 234 of each guide rod 230 has a rounded or convex shape. This may facilitate installation of the press section 240 onto the various guide rods 230.

Any appropriate number of multiple guide rods 230 may be utilized by the leak testing system 210. Typically at least three guide rods 230 will be utilized by the leak testing system 210. Four guide rods 230 are used by the illustrated embodiment, and are disposed in a rectangular arrangement. Other arrangements of multiple guide rods 230 may be utilized. In any case, the guide rods 230 are disposed at least substantially parallel to one another. In the illustrated embodiment, each guide rod 230 is disposed at least substantially perpendicular to the flat or planar portion of the first base section surface 226 that interfaces with the medicament pouch 200 during a leak test.

The press section 240 may be at least generally in the form of a plate, and may be formed from any appropriate material or combination of materials (e.g., metal, for instance stainless steel). A first press section surface 246 and a second press section surface 244 may be provided for the press section 240. The first press section surface 246 is that portion of the press section 240 that defines another boundary of the above-noted medicament pouch cavity 250—a space in which the medicament pouch 200 may be positioned when being leak tested. The first press section surface 246 and the second press section surface 244 may be characterized as being oppositely disposed.

At least that portion of the first press section surface 246 that interfaces with the medicament pouch 200 during a leak test is flat or planar (such a flat or planar portion of the first press section surface 246 may be characterized as a compression surface). The entirety of the first press section surface 246 is flat or planar in the illustrated embodiment. The entirety of each of the first press section surface 246 and the second press section surface 244 may be flat or planar, including where the first press section surface 246 and the second press section surface 244 are disposed in at least substantially parallel relation to one another.

The spacing between the first press section surface 246 and the second press section surface 244 defines a thickness for the press section 240. A plurality of holes 242 extend between the second press section surface 244 and the first press section surface 246—each hole 242 extends through the entire thickness of the press section 240. The various holes 242 on the press section 240 may be disposed in at least substantially parallel relation to one another (more specifically, the perimeter sidewall surfaces that define these holes 242 may be disposed at least substantially parallel relation to one another). Each hole 242 of the press section 240 is aligned with a corresponding hole 222 of the base section 220 (e.g., a center axis of each hole 242 of the press section 240 may be axially aligned or co-linear with a center axis of a corresponding hole 222 of the base section 220).

The press section 240 may be characterized as being movably mounted on the various guide rods 230. In the illustrated embodiment, the press section 240 slides along the various guide rods 230 to change the spacing between the press section 240 and the base section 220. The press section 240 may be positioned at least substantially parallel with the base section 220 when first positioning the press section 240 on the various guide rods 230. This may be done manually by a user or operator of the leak testing system 210. More specifically, the flat or planar portion of the first press section surface 246 that interfaces with the medicament pouch 200 during a leak test is maintained at least substantially parallel with the flat or planar portion of the first base section surface 226 that interfaces with the medicament pouch 200 during a leak test, all when directing the free end 234 of each guide rod 230 into a corresponding hole 242 of the press section 240. When the press section 240 is mounted on the various guide rods 230, the flat or planar portion of the first press section surface 246 that interfaces with the medicament pouch 200 during a leak test should be at least substantially parallel with the flat or planar portion of the first base section surface 226 that interfaces with the medicament pouch 200 during a leak test.

Figure 7:
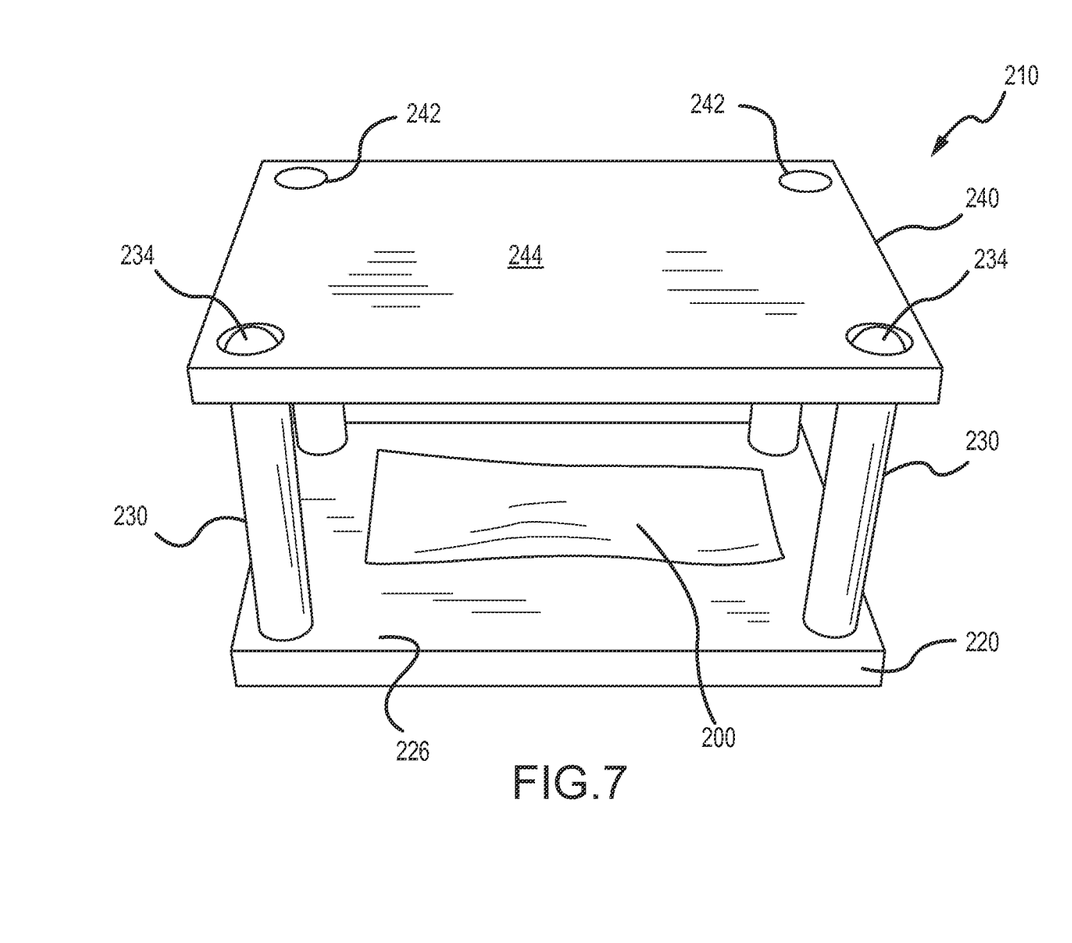
FIG. 7 is a perspective view of the leak testing system of FIG. 4, with a medicament pouch in position for performance of a leak test.

FIG. 7 illustrates the initial positioning of the press section 240 on the guide rods 230. Multiple guide rods 230 may be simultaneously directed into a corresponding hole 242 of the press section 240 (e.g., manually by a user or operator of the leak testing system 210). At this time the base section 220 and the press section 240 are spaced from one another and define the above-noted medicament pouch cavity 250. In this regard, a medicament pouch 200 may be positioned on a flat or planar portion of the first base section surface 226 of the base section 220. An absorbent sheet or the like (not shown) could be positioned between the medicament pouch 200 and the first base section surface 226 of the base section 220. In any case, the press section 240 may be moved along the various guide rods 230 (e.g., via a sliding engagement) and at least generally in the direction of the base section 220. During this movement of the press section 240, the flat portion of the first press section surface 246 that will engage the medicament pouch 200 during the leak test should be maintained at least substantially parallel to the flat portion of the first base section surface 226 of the base section 220 that is engaging the medicament pouch 200 (e.g., by the orientation of the guide rods 230, and the slidable interaction between the guide rods 230 and the press section 240). A user or operator of the leak testing system 210 may manually support the press section 240 and may assist/guide the press section 240 along the various guide rods 230 in the direction of the base section 220. Alternatively, a user or operator of the leak testing system 210 may manually support the press section and primarily use gravitational forces (e.g., the weight of the press section 240) to move the same in the direction of the base section 220.

Figure 8:
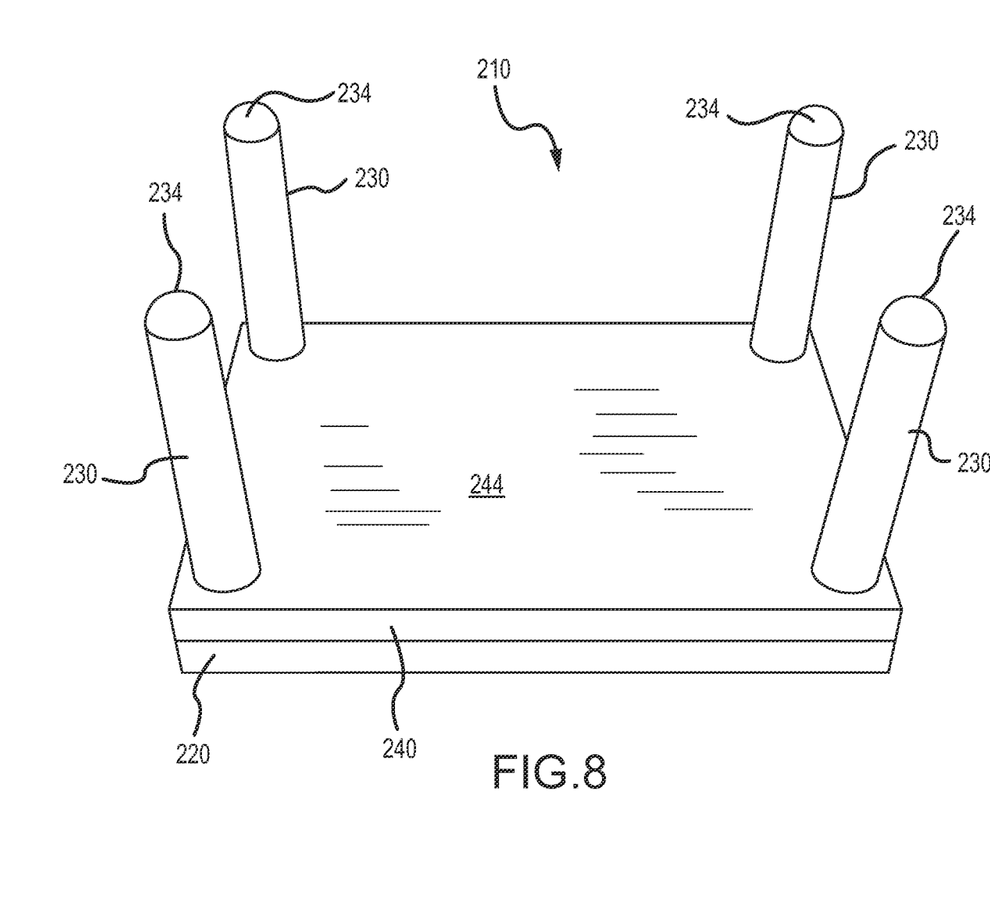
FIG. 8 is a perspective view of the leak testing system of FIG. 4, during the performance of a leak test on a medicament pouch.

The press section 240 is moved in the above-noted manner until a flat or planar portion of the first press section surface 246 contacts the medicament pouch 200, for instance as shown in FIG. 8. The press section 240 and the base section 220 may be characterized as contacting oppositely disposed portions of the medicament pouch 200 with flat or planar surfaces that are disposed in at least substantially parallel relation to one another. One embodiment has the first sheet 202 of the medicament pouch 200 lying at least substantially flat on a flat portion of the first base section surface 226, and has the second sheet 204 of the medicament pouch 200 being engaged by a flat portion of the first press section surface 246.

The medicament pouch 200 may be compressed between the base section 220 and the press section 240—while being engaged by a flat/planar portion of the first base section surface 226 and a flat/planar portion of the first press section surface 246, which again should be in at least substantially parallel relation at this time (FIG. 8). At least part of the compressive force may be provided by gravitational forces—gravity acts on the press section 240 and attempts to move the same in the direction of the base section 220 and by sliding along the guide rods 230. The entirety of the compressive force may be provided by these gravitational forces (e.g., gravitational forces acting on the press section 240; stated another way, the leak testing system 210 does not require any external power source to generate/provide the desired degree of compressive force in relation to the medicament pouch 200). Stated another way, the weight of the press section 240 alone may be used to compress the medicament pouch 200 between the base section 220 and the press section 240. In one embodiment, the press section 240 weighs about 1 kg. Other weights may be appropriate for the press section 240. The leak testing system 210 could utilize a number of different press sections 240, each being of a different weight. Moreover, one or more external weights could be positioned on the second press section surface 244 of the press section 240 (or otherwise installed on the press section 240) to provide enhanced compressive forces (including where the entirety of these compression forces are in the form of gravitational forces).

After a sufficient amount of time for the compressive forces to act on the medicament pouch 200, the press section 240 may be moved away from the base section 220 along the various guide rods 230 (e.g., by a user or operator of the leak testing system 210 exerting a lifting force on the press section 240). During this movement of the press section 240 away from the base section 220, a flat portion of the first press section surface 246 that interfaced with the medicament pouch 200 during the leak test may be maintained in at least substantially parallel relation with a flat portion of the first base section surface 226 that interfaced with the medicament pouch 200 during the leak test (e.g., by sliding the press section 240 along the guide rods 230, which again may be disposed at least substantially perpendicular to both the flat portion of the first press section surface 246 and the flat portion of the first base section surface 226 that interfaced with the medicament pouch 200 during the leak test). The press section 240 could be removed entirely from the various guide rods 230. In any case, once the press section 240 is sufficiently spaced from the base section 240, the medicament pouch 200 may be assessed for any leaks. Any leakage from the medicament pouch 200 during the leak testing described herein should be evident from viewing the medicament pouch 200, the first base section surface 226 of the base section 220, and/or any absorbent layer that may be disposed between the medicament pouch 200 and the first base section surface 226 of the base section 220.

The leak testing system 210 may be used for detecting gross leaks in single-dose sachets containing an appropriate medication, typically in the form of a liquid or other flowable substance. Leak testing with the leak testing system 210 may be integrated with the manufacturing process for medicament pouches 200, may be integrated as part of post-manufacturing product testing of medicament pouches 200, or during stability testing.

Based upon the foregoing, it should be appreciated that the leak testing system 210 is structurally simple and does not require the use of any external power source to move the press section 240 in the direction of the base section 220 or to move the press section 240 away from the base section 220. Therefore, electrical power is not required for operation of the leak testing system 210.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A leak testing system for a medicament pouch, comprising:
    a base section and a separate press section that is positioned above said base section, wherein said base section is positioned on a supporting surface and comprises a first base section surface that projects toward said press section, wherein said press section comprises a first press section surface that projects toward said base section, and wherein said press section further comprises first, second, and third through holes;
    first, second, and third guides rods that are each threadably engaged with said base section, that each extend upwardly and away from said base section and terminate at a rounded free end that is disposed at a higher elevation than said base section, and that are disposed in parallel relation to one another, wherein said first, second, and third guide rods extend into said first, second, and third through holes, respectively, of said press section such that each said rounded free end is positioned beyond a second press section surface that is opposite of said first press section surface, and wherein said press section is slidably mounted on said first, second, and third guide rods;
    a medicament pouch, wherein an entirety of said medicament pouch is positioned on a flat portion of said first base section surface, wherein an entirety of said medicament pouch is positioned against a flat portion of said first press section surface, wherein said first, second, and third guide rods are oriented perpendicularly to said flat portion of said first base section surface and said flat portion of said first press section surface, wherein a single biasing force biases said press section in a direction of said base section, wherein said single biasing force is a gravitational force, and wherein said medicament pouch is compressed between said base section and said press section.

2. The leak testing system of claim 1, wherein said base section comprises a plate.

3. The leak testing system of claim 1, wherein said base section comprises stainless steel.

4. The leak testing system of claim 1, wherein said base section is maintained in a stationary position.

5. The leak testing system of claim 1, wherein an entirety of said first base section surface is flat.

6. The leak testing system of claim 1, further comprising a fourth guide rod that is threadably engaged with said base section, that extends away from said base, and that terminates at a rounded free end, wherein said fourth guide rode is disposed in parallel relation to each of said first, second, and third guide rods and extends through a fourth through hole of said press section, wherein said press section is further slidably mounted on said fourth guide rod.

7. The leak testing system of claim 6, wherein said first, second, third, and fourth guide rods are disposed in a rectangular arrangement.

8. The leak testing system of claim 1, wherein each of said first, second, and third guide rods is in the form of a cylindrical rod.

9. The leak testing system of claim 1, wherein each of said base section and said first, second, and third guide rods are maintained in a stationary position relative to said press section.

10. The leak testing system of claim 1, wherein said press section comprises at least one plate.

11. The leak testing system of claim 1, wherein said press section comprises stainless steel.

12. The leak testing system of claim 1, wherein an entirety of said first press section surface is flat.

13. The leak testing system of claim 1, wherein said base section, said first, second, and third guide rods, and said press section are all formed from a common material.

14. The leak testing system of claim 1, wherein said medicament pouch is a pliable structure.

15. The leak testing system of claim 1, wherein said medicament pouch comprises first and second sheets that are sealed together to define an internal storage volume.

16. The leak testing system of claim 1, wherein said medicament pouch comprises a liquid medicament.

17. The leak testing system of claim 1, wherein said medicament pouch comprises a topical medication.

18. The leak testing system of claim 1, wherein said medicament pouch comprises a single dose.

\* \* \* \* \*